US008249920B2

(12) United States Patent
Smith

(10) Patent No.: US 8,249,920 B2
(45) Date of Patent: Aug. 21, 2012

(54) INTERACTIVE MARKETING SYSTEM USING SHORT TEXT MESSAGES

(75) Inventor: Glen David Smith, Auckland (AU)

(73) Assignee: Zyzeba Holding Limited, Auckland (NZ)

( * ) Notice: Subject to any disclaimer, the term of this patent is extended or adjusted under 35 U.S.C. 154(b) by 1348 days.

(21) Appl. No.: 10/240,775

(22) PCT Filed: Apr. 5, 2001

(86) PCT No.: PCT/NZ01/00051
§ 371 (c)(1), (2), (4) Date: Sep. 12, 2003

(87) PCT Pub. No.: WO01/78345
PCT Pub. Date: Oct. 18, 2001

(65) Prior Publication Data
US 2004/0034561 A1    Feb. 19, 2004

(30) Foreign Application Priority Data
Apr. 7, 2000 (NZ) .......................................... 503817

(51) Int. Cl.
*G06Q 30/00* (2012.01)
(52) U.S. Cl. ..................................................... 705/14.1
(58) Field of Classification Search ................... 705/14, 705/14.1
See application file for complete search history.

(56) References Cited

U.S. PATENT DOCUMENTS

| | | |
|---|---|---|
| 3,502,813 A | 3/1970 | Walker |
| 4,290,141 A | 9/1981 | Anderson et al. |
| 4,962,377 A | 10/1990 | Wallace et al. |
| 5,226,177 A | 7/1993 | Nickerson |
| 5,263,723 A | 11/1993 | Pearson et al. |
| 5,365,551 A | 11/1994 | Snodgrass et al. |
| 5,377,354 A | 12/1994 | Scannell et al. |
| 5,403,999 A | 4/1995 | Entenmann et al. |
| 5,473,673 A | 12/1995 | Van Wijk et al. |
| 5,500,650 A | 3/1996 | Snodgrass et al. |
| 5,577,103 A | 11/1996 | Foti |
| 5,579,372 A | 11/1996 | Åström |
| 5,627,544 A | 5/1997 | Snodgrass et al. |
| 5,717,866 A * | 2/1998 | Naftzger ..................... 705/14.38 |

(Continued)

FOREIGN PATENT DOCUMENTS

AU              200113825          5/2001

(Continued)

OTHER PUBLICATIONS

"m-Wise Launches First-Ever Interactive Text Messaging Competition," M-Wise press release of Nov. 20, 2000, from m-Wise website.

(Continued)

*Primary Examiner* — Daniel Lastra

(74) *Attorney, Agent, or Firm* — Young & Thompson

(57) ABSTRACT

An interactive direct response system combines the use of short text message systems (SMS) via cell phones (100) with a database (102) and website to enable advertisers to view in real time customer responses to a direct response campaign. Customers are invited to respond to a defined advertisement on for example a billboard by responding to a single telephone number associated with the website by sending a text message linked to that particular advertisement, i.e. a single word (104,106). A computer receives and analyses the responses and sends an acknowledgement message to the customer.

38 Claims, 7 Drawing Sheets

U.S. PATENT DOCUMENTS

| | | | |
|---|---|---|---|
| 5,768,509 A | 6/1998 | Gunluk | |
| 5,774,534 A | 6/1998 | Mayer | |
| 5,794,210 A * | 8/1998 | Goldhaber et al. | 705/14 |
| 5,838,774 A | 11/1998 | Weisser, Jr. | |
| 5,852,775 A | 12/1998 | Hidary | |
| 5,857,156 A * | 1/1999 | Anderson | 455/517 |
| 5,937,390 A * | 8/1999 | Hyodo | 705/14.61 |
| 5,937,392 A * | 8/1999 | Alberts | 705/14 |
| 5,946,629 A | 8/1999 | Sawyer et al. | |
| 5,948,061 A * | 9/1999 | Merriman et al. | 709/219 |
| 5,960,409 A * | 9/1999 | Wexler | 705/14.41 |
| 5,970,385 A | 10/1999 | Pykalisto | |
| 5,983,196 A | 11/1999 | Wendkos | |
| 5,984,367 A * | 11/1999 | Barnhart et al. | 283/92 |
| 6,006,197 A * | 12/1999 | d'Eon et al. | 705/10 |
| 6,009,409 A * | 12/1999 | Adler et al. | 705/14 |
| 6,044,135 A | 3/2000 | Katz | |
| 6,047,194 A * | 4/2000 | Andersson | 455/466 |
| 6,052,591 A | 4/2000 | Bhatia | |
| 6,114,969 A | 9/2000 | Hymel | |
| 6,151,507 A | 11/2000 | Laiho et al. | |
| 6,154,646 A | 11/2000 | Tran et al. | |
| 6,286,005 B1 * | 9/2001 | Cannon | 707/100 |
| 6,295,528 B1 | 9/2001 | Marcus et al. | |
| 6,332,127 B1 * | 12/2001 | Bandera et al. | 705/14.55 |
| 6,388,561 B1 | 5/2002 | Tuttle | |
| 6,415,156 B1 | 7/2002 | Stadelmann | |
| 6,470,079 B1 * | 10/2002 | Benson | 379/114.13 |
| 6,470,181 B1 | 10/2002 | Maxwell | |
| 6,493,558 B1 | 12/2002 | Bernhart et al. | |
| 6,505,052 B1 | 1/2003 | Jou | |
| 6,512,926 B1 | 1/2003 | Henry-Labordere | |
| 6,560,456 B1 | 5/2003 | Lohtia et al. | |
| 6,564,261 B1 | 5/2003 | Gudjonsson et al. | |
| 6,647,256 B1 | 11/2003 | Stewen et al. | |
| 6,671,513 B1 | 12/2003 | Frank et al. | |
| 6,754,641 B2 | 6/2004 | Kolls | |
| 7,010,263 B1 * | 3/2006 | Patsiokas | 455/3.02 |
| 2001/0016819 A1 | 8/2001 | Kolls | |
| 2002/0013711 A1 | 1/2002 | Ahuja et al. | |
| 2002/0044058 A1 | 4/2002 | Heinrich et al. | |
| 2002/0132575 A1 * | 9/2002 | Kesling et al. | 455/2.01 |
| 2003/0036395 A1 | 2/2003 | Proidl | |
| 2003/0079135 A1 | 4/2003 | Jones | |
| 2003/0145037 A1 | 7/2003 | Von Garssen | |
| 2003/0194350 A1 | 10/2003 | Stamatelos et al. | |
| 2003/0200173 A1 | 10/2003 | Chang | |
| 2003/0219709 A1 | 11/2003 | Olenick et al. | |
| 2004/0010630 A1 | 1/2004 | Becher-Wickes et al. | |
| 2004/0014454 A1 | 1/2004 | Burgess et al. | |
| 2004/0078340 A1 | 4/2004 | Evans | |
| 2004/0088244 A1 | 5/2004 | Bartter et al. | |
| 2004/0097245 A1 | 5/2004 | Sheth et al. | |
| 2004/0116128 A1 | 6/2004 | Chen | |
| 2004/0116136 A1 | 6/2004 | Voehringer | |
| 2004/0132530 A1 | 7/2004 | Rutanen | |
| 2004/0176081 A1 | 9/2004 | Bryham et al. | |
| 2004/0176666 A1 | 9/2004 | Chait | |
| 2004/0198329 A1 | 10/2004 | Vasa | |
| 2004/0209677 A1 | 10/2004 | Park et al. | |

FOREIGN PATENT DOCUMENTS

| | | |
|---|---|---|
| AU | 2001100406 | 11/2001 |
| BE | 107073 | 3/2004 |
| CA | 2405221 | 10/2001 |
| CA | 2354535 | 7/2004 |
| CA | 2418638 | 8/2004 |
| CN | 1432949 | 7/2003 |
| CN | 1437376 | 8/2003 |
| DE | 199 38 201 A1 | 2/2001 |
| DE | 10133887 | 1/2003 |
| DE | 10235547 | 10/2003 |
| DE | 10246650 | 4/2004 |
| DE | 10251024 | 5/2004 |
| DE | 10252697 | 5/2004 |
| EP | 833469 | 1/1998 |
| EP | 896 484 A2 | 2/1999 |
| EP | 986273 | 3/2000 |
| EP | 1091607 | 4/2001 |
| EP | 1096405 | 5/2001 |
| EP | 1109414 | 6/2001 |
| EP | 1139116 | 10/2001 |
| EP | 1184818 | 3/2002 |
| EP | 986275 | 7/2002 |
| EP | 1274262 | 1/2003 |
| EP | 1385297 | 1/2004 |
| FI | 982833 | 8/2000 |
| FR | 2845846 | 4/2004 |
| GB | 2308474 | 6/1997 |
| GB | 2373138 | 9/2002 |
| GB | 2384604 | 7/2003 |
| GB | 2387702 | 10/2003 |
| GB | 2390915 | 1/2004 |
| GB | 2393833 | 4/2004 |
| GB | 2400225 | 6/2004 |
| GB | 2399669 | 9/2004 |
| KR | 1020020051810 | 6/2002 |
| KR | 1020020056985 | 7/2002 |
| KR | 1020020059070 | 7/2002 |
| KR | 1020020061747 | 7/2002 |
| KR | 1020030005754 | 1/2003 |
| KR | 1020030029601 | 4/2003 |
| KR | 1020030048662 | 6/2003 |
| KR | 1020030050399 | 6/2003 |
| KR | 1020030078410 | 10/2003 |
| KR | 1020030079161 | 10/2003 |
| KR | 1020030084859 | 11/2003 |
| KR | 1020030087996 | 11/2003 |
| KR | 1020030093799 | 12/2003 |
| NZ | 330703 | 3/2000 |
| NZ | 501706 | 8/2001 |
| NZ | 522421 | 2/2003 |
| NZ | 503817 | 5/2003 |
| TW | 513651 | 12/2002 |
| WO | WO 88/05239 | 7/1988 |
| WO | WO 96/13814 | 5/1996 |
| WO | WO 97/17682 | 5/1997 |
| WO | 97/31306 | 8/1997 |
| WO | WO 97/49251 | 12/1997 |
| WO | WO 98/09255 | 3/1998 |
| WO | WO 98/09451 | 3/1998 |
| WO | WO 98/18251 | 4/1998 |
| WO | WO 98/47270 | 10/1998 |
| WO | WO 98/48587 | 10/1998 |
| WO | WO 99/01826 | 1/1999 |
| WO | WO 99/34272 | 7/1999 |
| WO | WO 99/42964 | 8/1999 |
| WO | WO 99/49680 | 9/1999 |
| WO | WO 99/59283 | 11/1999 |
| WO | WO 99/65256 | 12/1999 |
| WO | WO 99/66701 | 12/1999 |
| WO | 00/04476 | 1/2000 |
| WO | 00/18106 | 3/2000 |
| WO | 00/21293 | 4/2000 |
| WO | WO 00/22906 | 4/2000 |
| WO | WO 00/22907 | 4/2000 |
| WO | 00/35216 | 6/2000 |
| WO | WO 00/22908 | 6/2000 |
| WO | WO 00/41415 | 7/2000 |
| WO | 00/62518 | 10/2000 |
| WO | WO 00/62564 | 10/2000 |
| WO | WO 00/72612 | 11/2000 |
| WO | 00/76235 A1 | 12/2000 |
| WO | WO 01/13298 | 2/2001 |
| WO | WO 01/13341 | 2/2001 |
| WO | WO 01/22748 | 3/2001 |
| WO | WO 01/23055 | 4/2001 |
| WO | WO 01/37540 | 5/2001 |
| WO | WO 01/37595 | 5/2001 |
| WO | WO 01/47291 | 6/2001 |
| WO | WO 01/52541 | 7/2001 |
| WO | WO 01/52558 | 7/2001 |
| WO | WO 01/52572 | 7/2001 |
| WO | WO 01/67718 | 9/2001 |
| WO | WO 01/71949 | 9/2001 |
| WO | WO 01/75823 | 10/2001 |

| WO | WO 01/76173 | 10/2001 |
| WO | WO 01/77978 | 10/2001 |
| WO | WO 01/98983 | 12/2001 |
| WO | WO 02/11088 | 2/2002 |
| WO | WO 02/13120 | 2/2002 |
| WO | WO 02/21416 | 3/2002 |
| WO | WO 02/27629 | 4/2002 |
| WO | WO 02/44829 | 6/2002 |
| WO | WO 02/076122 | 9/2002 |
| WO | WO 02/101584 | 12/2002 |
| WO | WO 03/083737 | 10/2003 |
| WO | WO 03/084187 | 10/2003 |
| WO | WO 03/084252 | 10/2003 |
| WO | WO 2004/010361 | 1/2004 |
| WO | WO 2004/034212 | 4/2004 |
| WO | WO 2004/049716 | 6/2004 |
| WO | WO 2004/068386 | 8/2004 |
| WO | WO 2004/068880 | 8/2004 |

OTHER PUBLICATIONS

"First Interactive Texting Competition Proves a Winner," M-Wise press release of Dec. 4, 2000, from m-Wise website.
"In Paegas Brand Stores You can Buy a Mobile Phone on Instalments Too", T-Mobile Press Centre, http://en/t-press.cz/tiskove_zpravy/2000/143/, Apr. 5, 2000.
"RadioMobilA's Revenues Reached The Boundary of 11 Billion Crowns in 1999", T-Mobile Press Centre, http://en.t-press.cz/tiskove$_{13}$ zpravy/2000/141/, Apr. 4, 2000.
"Name of the Prague Writers A' Festival is Connected With the Paegas Brand Again", T-Mobile Press Centre, http://en.t.press.cz/tiskove_zpravy/2000/142/, Apr. 4, 2000.
"Novelties for April: Paegas Offers Three Phones Supporting WAP", T-Mobile Press Centre, http://en.t-press.cz/tiskove_zpravy/2000/140/, Mar. 31, 2000.
"Only Users of Paegas Service Can Use GSM Banking", T-Mobile Press Centre, http://en.t-press.cz/tiskove_zpravy/2000/138/, Mar. 23, 2000.
"As The First in the World, Paegas Offers GSM Banking on Prepaid Cards", T-Mobile Press Centre, http://en.t-press.cz/tiskove_zpravy/2000/137/, Mar. 23, 2000.
"RadioMobil Rises on the Chart of the Most Admired Czech Companies", T-Mobile Press Centre, http://en.t-press.cz/tiskove_zpravy/2000/136/, Mar. 23, 2000.
"Practically All Users of Paegas Services Tried A Half Price Call", T-Mobile Press Centre, http://en.t-press.cz/tiskove_zpravy/2000/135/, Mar. 21, 2000.
"Paegas Comes With A World Unique Service For Foreign Customers", T-Mobile Press Centre, http://en.t-press.cz/tiskove_zpravy/2000/134/. Mar. 20, 2000.
"All Users of Paegas Services Will Celebrate the Overstepping of the Million Boundary", T-Mobile Press Centre, http://en.t-press.cz/tiskove_zpravy/2000/133/, Mar. 14, 2000.
"Paegas is the First GSM Network Offering Data and Fax for Free to All Customers", T-Mobile Press Centre, http://en.t-press.cz/tiskove_zpravy/2000/131/, Mar. 8, 2000.
"Twist is the First Pre-paid Service Allowing W@P Applications", T-Mobile Press Centre, http://en.t-press.cz/tiskove_zpravy/2000/130/, Mar. 8, 2000.
"You Can Get The Most Advantageous Pre-paid Service Paegas Twist for Only CZK 1 399", T-Mobile Press Centre, http://en.t-press.cz/tiskove_zpravy/2000/129/, Mar. 6, 2000.
"RadioMobil Invests Billions into its Network Every Year", T-Mobile Press Centre, http://en.t-press.cz/tiskove_zpravy/2000/128/, Feb. 23, 2000.
"Awards received by RadioMobil in 1999-2000:", T-Mobile Press Centre, http://en.t-press.cz/tiskove_zpravy/2000/126/, Feb. 21, 2000.
"Paegas Twist, the most successful prepaid service in the Czech Republic, is also the cheapest", T-Mobile Press Centre, http://en.t-press.cz/tiskove_zpravy/2000/125/, Feb. 17, 2000.
"Paegas to expand its office of WAP services", T-Mobile Press Centre, http://en.t-press.cz/tiskove_zpravy/2000/124/, Feb. 15, 2000.

"For the first time in the Czech Republic, a single operator earned more than 500,000 new customers in one year", T-Mobile Press Centre, http://en.t-press.cz/tiskove_zpravy/2000/122/, Jan. 6, 2000.
"Paegas dominates the mobile communications market in the Czech Republic"; T-Mobile Press Centre, http://en.t-press.cz/tiskove_zpravy/1999/121, Dec. 6, 1999.
"Pre-Christmas innovations from Paegas", T-Mobile Press Centre, http://en.t-press.cz/tiskove_zpravy/1999/118/, Nov. 30, 1999.
"With Paegas Gold certificate, mobile telephone activation is free", T-Mobile Press Centre, http://en.t-press.cz/tiskove_zpravy/1999/117/, Nov. 22, 1999.
"The indoor stadium (Sportovni hala) at Pragues Exhibition Grounds (VystavistA?) is to be named Paegas Arena", T-Mobile Press Centre, http://en.t-press.cz/tiskove_zpravy/1999/116/, Nov. 18, 1999.
"Paegas hosts prominent world dignitaries", T-Mobile Press Centre, http://en.t-press.cz/tiskove_zpravy/1999/115/, Nov. 16, 1999.
"A Christmas present from Paegas to every new customer", T-Mobile Press Centre, http://en. t-press.cz/tiskove_zpravy/1999/113/, Nov. 10, 1999.
"Announcement", T-Mobile Press Centre, http://en.t-press.cz/tiskove_zpravy/1999/112/, Nov. 9, 1999.
"Louny Call Center commences operation", T-Mobile Press Centre, http://en.t-press.cz/tiskove_zpravy/1999/111/, Nov. 5, 1999.
"The biggest advantages while travelling abroad are available with Twist", T-Mobile Press Centre, http://en.t-press.cz/tiskove_zpravy/1999/110/, Nov. 4, 1999.
"Paegas customers can now communicate in seven languages", T-Mobile Press Centre, http://en.t-press.cz/tiskove_zpravy/1999/109/, Nov. 1, 1999.
"Paeges Nej-call your friends at a discount of up to 50%", T-Mobile Press Centre, http://en.t-press.cz/tiskove_zpravy/1999/108, Nov. 1, 1999.
"The Czech public regards RadioMobil as one of the most go-ahead companies-and one of the most expanding", T-Mobile Press Centre, http://en.t-press.cz/tiskove_zpravy/1999/107/, Oct. 11, 1999.
"Coca-Cola Via The Paegas Network", T-Mobile Press Centre, http://en.t-press.cz/tiskove_zpravy/1999/102/, Oct. 4, 1999.
"RadioMobil has received confirmation that is has fulfilled the licence conditions", T-Mobile Press Centre, http://en.t-press.cz/tiskove_zpravy/1999/96/, Aug. 13, 1999.
"Paegas Internet Call: Better and faster international connections at advantageous prices", T-Mobile Press Centre, http://en.t-press.cz/tiskove_zpravy/1999/93/, Jul. 27, 1999.
"Paegas is winning the battle for customers", T-Mobile Press Centre, http://en.t-press.cz/tiskove_zpravy/1999/92/, Jul. 16, 1999.
"Mobile Internet Becomes Reality in the Paegas Network Thanks to the GPRS Technology", T-Mobile Press Centre, http://en.t-press.cz/tiskove_zpravy/1999/91/, Jul. 14, 1999.
"Hot Festival News in a Mobile", T-Mobile Press Centre, http://en.t-press.cz/tiskove_zpravy/1999/88/, Jul. 1, 1999.
"Paegas opens its 20$^{th}$ outlet", T-Mobile Press Centre, http://en.t-press.cz/tiskove_zpravy/1999/89/, Jul. 1, 1999.
"East Traveling Around the World with Paegas", T-Mobile Press Centre, http://en.t-press.cz/tiskove_zpravy/1999/87/, Jun. 24, 1999.
"Paegas Assistant 333 gets enthusiastic response", T-Mobile Press Centre, http://en.t-press.cz/tiskove_zpravy/1998/81/, May 28, 1999.
"Paegas no longer 603 but 604 as well", T-Mobile Press Centre, http://en.t-press.cz/tiskove_zpravy/1999/82/, May 28, 1999.
"The widest offer of Paegas Twist packets and other news in half of May", T-Mobile Press Centre, http://en.t-press.cz/tiskove_zpravy/1999/78/, May 14, 1999.
"WAP Technology Brings Internet to Paegas GSM Mobile Telephones", T-Mobile Press Centre, http://en.t-press.cz/tiskove_zpravy/1999/77/, May 10, 1999.
"Customers in the Czech Republic prefer GSM services", T-Mobile Press Centre, http://en.t-press.cz/tiskove_zpravy/1999/71/, May 3, 1999.
"Paegas Asistent 333: effective, quick and safe communication", T-Mobile Press Centre, http://en.t-press.cz/tiskove_zpravy/1997/73/, May 3, 1999.
"Mobile with Paegas SIM Toolkit Twist card only 4,499 KAT", T-Mobile Press Centre, http://en.t-press.cz/tiskove_zpravy/1999/68/, Apr. 14, 1999.

"Paegas services collect more awards", T-Mobile Press Centre, http://en.t-press.cz/tiskove_zpravy/1999/65/, Apr. 1, 1999.

"Paegas: new offerings for April", T-Mobile Centre, http://en.t-press.cz./tiskove_zpravy/1999/66/, Apr. 1, 1999.

"Paegas offers lowest prices on telecommunications services", T-Mobile Press Centre, http://en.t-press.cz/tiskove_zpravy/1999/64/, Mar. 31, 1999.

"Paegas Customers Have Been Able to Call Even From Prague Underground Since Friday, Mar. 19, 1999!", T-Mobile Press Centre, http://en.t-press.cz/tiskove_zpravy/1999/62/, Mar. 19, 1999.

"RadioMobil named most-respected telecommunications company in Czech Republic", T-Mobile Press Centre, http://en.t-press.cz/tiskove_zpravy/1999/57/, Mar. 4, 1999.

"RadioMobil forced to halt Paegas Internet Call service at 5:00 p.m. today", T-Mobile Press Centre, http://en.t-press.cz/tiskove_zpravy/1999/56/, Feb. 25, 1999.

"Over 1 million SMS messages sent using prepaid Twist cards", T-Mobile Press Centre, http://en.t-press.cz/tiskove_zpravy/1999/54/, Feb. 16, 1999.

"RadioMobil to become main partner of Czech National Basketball Federation", T-Mobile Press Centre, http://en.t-press.cz/tiskove_zpravy/1995/55/, Feb. 16, 1999.

"Europe for 9.50 Kc, international for 12.90 Kc per minute", T-Mobile Press Centre, http://en.t-press.cz/tiskove_zpravy/1999/53, Jan. 28, 1999.

"Paegas GSM network covers 96 percent of Czech population", T-Mobile Press Centre, http://en.t-press.cz/tiskove_zpravy/1999/52/, Jan. 22, 1999.

"Paegas TWIST becomes first system to successfully transmit SMS", T-Mobile Press Centre, http://en.t-press.cz-tiskove_zpravy/1999/49/, Jan. 14, 1999.

"Paegas growth outstrips Czech mobile communications market by wide margin", T-Mobile Press Centre, http://en.t-press.cz/tiskove_zpravy/1999/50/, Jan. 14, 1999.

"No monthly fees, telephones for 1 Kc beginning in January", T-Mobile Press Centre, http://en.t-press.cz/tiskove_zpravy/1998/48/, Dec. 31, 1998.

"Paegas donates half a million crowns to $1^{st}$ Children's Clinic of Motol Faculty Hospital", T-Mobile Press Centre, http://en.t-press.cz/tiskove_zpravy/1998/47/, Dec. 18, 1998.

"Paegas issues first directory of GSM users in Czech Republic", T-Mobile Press Centre, http://en.t-press.cz/tiskove_zpravy/1998/45/, Nov. 30, 1998.

"Paegas GSM offers for December Paegas Twist packages include two Mobile of the Year winners", T-Mobile Press Centre, http://en.t-press.cz/tiskove_zpravy/1998/46/, Nov. 30, 1998.

"Paegas becomes main partner to Mobile of the Year survey", T-Mobile Press Centre, http://en.t-press.cz/tiskove_zpravy/1998/44/, Nov. 26, 1998.

"Paegas rapidly increasing number of transmission stations", T-Mobile Press Centre, http://en.t-press.cz/tiskove_zpravy/1998/32/, Nov. 24, 1998.

* cited by examiner

Example: Billboard Advertisement

FIG 6

INTERACTIVE MARKETING SYSTEM USING SHORT TEXT MESSAGES

FIELD OF THE INVENTION

This invention relates to an interactive marketing and/or survey system in particular but not limited to a marketing and/or survey system utilising short message services (SMS) provided on mobile or cell phones.

BACKGROUND ART

Traditional marketing and survey techniques have required survey companies to use pollsters to contact consumers by telephone and ask a series of questions, and then to have that data entered by the pollster or data entry clerk into a database. Some surveys are conducted by mail, and some marketing techniques request the consumer to fill out a pre printed reply card, mail it to the advertiser, and then the results are entered by a data entry clerk and the results analysed. All this takes time for the consumer, is costly for the advertiser and in any event has a considerable lag between the compiling of the questions and analysing the results.

PRIOR ART

U.S. Pat. No. 5,717,866—Issued to Naftzger in 1998 relates to a method for comparative analysis of consumer response to product promotions which provide discounts during point of sale transactions. This makes use of a keypad controlled by a cashier at a point of sale, and requires the cashier to send a code on the keypad to the appropriate computer system to then receive authorisation in relation to that discount before then checking through the items being purchased by the customer at the discounted price. It is limited to hardware installed at the point of sale.

USP 2002/0132575—this patent application was filed on 31 May 2001 and was published on 19 Sep. 2002. It relates to mobile commerce using a satellite radio broadcasting system. It is designed to help identify what programmes or parts of programmes are being listened by the public.

U.S. Pat. No. 7,010,263—this patent issued to Patsioks in 2006 and relates to a system and method for distributing music and data. This is another satellite based broadcasting system.

U.S. Pat. No. 5,960,409—this patent issued to Wexler in 1999 and relates to a third party online accounting system. It is an internet based system in which a download request signal is generated when a user clicks on a banner displayed on a web page.

U.S. Pat. No. 6,006,197—this patent issued to D'Eon et al in 1999 and relates to a system and method for assessing effectiveness of internet marketing campaigns. It is designed to correlate the number of impressions of web advertisements post impression transactional activity to measure the effectiveness of advertisements on web sites.

U.S. Pat. No. 6,286,005—issued to Cannon in 2001 and relates to a method and apparatus for analysing data and advertising optimisation. It relates to a data base mining engine designed to rank the effectiveness of different advertisements.

U.S. Pat. No. 5,857,156—issued to Anderson in 1999 and relates to personal intercommunication purchase and fulfilment system. It makes use of a satellite radio system, and a FM narrow band pager to communicate the customers request to purchase an item using an item code, and transmitting that to a base station to an appropriate supply house to ensure that the product is supplied to the base station.

U.S. Pat. No. 5,948,061—issued to Merriman et al in 1999 and relates to a method of delivery targeting and measuring advertising over network. It provides means for compiling statistics on individual users and networks and the use of advertisements on the internet.

U.S. Pat. No. 5,937,392—issued to Alberts in 1999 and relates to banner advertisement display system and method with frequency of advertisement control. This web based advertising system that determines how often a banner advertisement is displayed.

This list of patents are compiled from patents cited by the USPTO and either relate to point of sale electronic coupons as discussed in U.S. Pat. No. 5,717,866, or relate to means for analysing the effectiveness of advertisements on the internet.

All are cumbersome to implement and require the consumer to interact either with in store hardware, or by means of computers or two way pagers.

OBJECT OF THE INVENTION

It is an object of the present invention to provide a viable interactive marketing and/or survey system based on SMS messages, transmitted to mobile or cell phones or to at least provide the public with a useful choice.

SUMMARY OF THE INVENTION

In one aspect the invention provides an interactive marketing and/or survey system utilising short message systems (SMS) provided on mobile or cell phones including in combination a means of displaying an advertisement, the advertisement inviting a participant to respond with a defined short text message via SMS on a mobile or cell phone, computerised means for comparing and matching the participants short text message with one or more retained reference records, wherein in operation, if the participant's short text message matches any of the one or more records, information from the message is stored in a database.

Preferably the advertisement invites participants to respond to a common "reply to" telephone number.

Preferably all advertisements associated with the system use the same common "reply to" telephone number but each advertising campaign uses distinct pre-allocated short text message(s) and the computerised means analyses and displays the incoming replies and sorts them into their associated campaigns.

By making use of the present and developing ability to display short text messages on mobile or cell phones by what is known as short message services (SMS), the invention provides a way of using such short text messages as a means of advertising as well as for obtaining consumer feed back from existing main stream advertising media inclusive of television, radio, films, magazines, newspapers, bill boards and the Internet.

With the growth of the mobile or cell phone market worldwide and in particular the acceptance and use of SMS (Short Message Service) there has now opened up an opportunity for applications using this technology.

Typical mobile phone users carry their phones constantly as they go about their day to day business such as when reading the morning paper, travelling to work, passing billboards, reading magazines, and watching television. If they notice an advertisement which invites them to take action such as to "Win a trip" or "Give us your opinion" mobile phone users are more likely to respond if the process required is low cost, quick and simple when compared to making a conventional phone call or posting a letter, and examples of this are shown in the detailed description of this invention.

Importantly the present invention embraces what is regarded as a "pull" service as it is the consumer who actually initiates the transaction so that the implementation is considered to be "friendly". Unsolicited messages are not desirable in the mobile phone industry and the present system overcomes that requirement. The subject invention involves the application of a database having conditional filtering criteria to correlate a consumer's response or short text message to an advertising client's promotional offer. Criteria chosen in the advertiser's promotion will be used to determine the appropriate reply message or consumer response. In addition, by offering incentives to respond to advertisements, consumers will provide real time feedback indicating the effectiveness of the advertisements. The content of a particular response can indicate the consumer's recognition of the product or his or her opinion of the product. By this means, valuable survey evidence can be obtained. The content of the response can also provide the location and/or the publication in which the advertisement appeared. In the case of television or radio advertising the station which broadcasted the advertisement can also be identified by the particular response message. Multiple promotions could be run simultaneously using the same destination phone number as the content of the SMS will be specific to and will identify the particular promotion. Furthermore, to make it easier for participants, they can also store the phone number for later use. In the detailed examples, the competition participants are directed to a website by notifying the particular 'www' web address location in the SMS reply message, revenue from hits on the website can be generated. Real time voting or survey evidence can also be collected by this means. By using a special data base application, multiple voting by the same voter on the same mobile phone can be eliminated. Furthermore, real time graphical and statistical reports can be generated and supplied to clients of the service via a secured Internet interface system.

Preferably the means of displaying an advertisement can be television, magazines, newspapers, billboards films, and/or the Internet.

Preferably the advertisement can be broadcast on radio or other non-visual means.

Preferably the computerised means for comparing and matching the participant's short text message response is a computer database which is connected by a virtual private network via the Internet to the SMS provider.

Preferably the computerised means also includes means for recording the number of correct and incorrect responses made by participants and the number of reply messages sent to the participants.

Preferably the computerised means can accommodate a number of phone numbers and/or groups of reference records corresponding to different advertisement offers or surveys conducted and a record is kept of the frequency of responses to each phone number or group of records, so that quantitative data such as the frequency or total number of consumer or voting response to a particular promotion or survey can be obtained.

Preferably the short text message response of a participant or consumer is a single word which can be easily compared and matched against a reference list of "correct" words stored on the computer database.

Preferably the Internet website to which the participant is instructed to access is a dedicated website which centrally co-ordinates all incoming SMS messages and provides the participants with further information in order to continue or proceed to the next step of the marketing or survey system.

In another aspect the invention resides in an interactive marketing and/or survey system utilising short message systems (SMS) provided on mobile or cell phones including in combination a means of displaying an advertisement, the advertisement inviting a participant to respond with a short text message via SMS on a mobile or cell phone, computerised means for comparing and matching the participants short text message with one or more retained reference records, wherein in operation, if the participant's short text message matches any of the one or more records, a reply message is sent by said computerised means to the participant's mobile or cell phone instructing the participant to proceed to a next step, typically to access an Internet website.

Preferably the means of displaying an advertisement can be television, magazines, newspapers, billboards, films, and/or the Internet.

In the alternative the advertisement can be broadcast on radio or other non-visual means.

Preferably the computerised means for comparing and matching the participant's short text message response is a computer database which is connected by a virtual private network via the Internet to the SMS provider.

Preferably the computerised means also includes means for recording the number of correct and incorrect responses made by participants and the number of reply messages sent to the participants.

Preferably the computerised means can accommodate a number of phone numbers and/or groups of reference records corresponding to different advertisement offers or surveys conducted and a record is kept of the frequency of responses to each phone number or group of records. By such means quantitative data such as the frequency or total number of consumer or voting response to a particular promotion or survey can be obtained.

Preferably the short text message response of a participant or consumer is a single word which can be easily compared and matched against a reference list of "correct" words stored on the computer database.

Preferably the Internet website to which the participant is instructed to access is a dedicated website which centrally co-ordinates all incoming SMS messages and provides the participants with further information in order to continue or proceed to the next step of the marketing or survey system.

BRIEF DESCRIPTION OF THE DRAWINGS

In order to understand the invention more fully, reference is made to the accompanying illustrations wherein:

FIG. 6: shows a log of calls made in testing the invention.

DETAILED DESCRIPTION OF THE DRAWINGS

Example 1

Figure 1:
FIG. 1: shows an example of an advertisement requiring an SMS texted response according to Example 1.

FIG. 1 of Example 1 shows an example of an advertisement 10 inviting a participant to call a telephone number and to key in an appropriate alphanumeric response 12, and in this case, the word "PISA".

Figure 2:
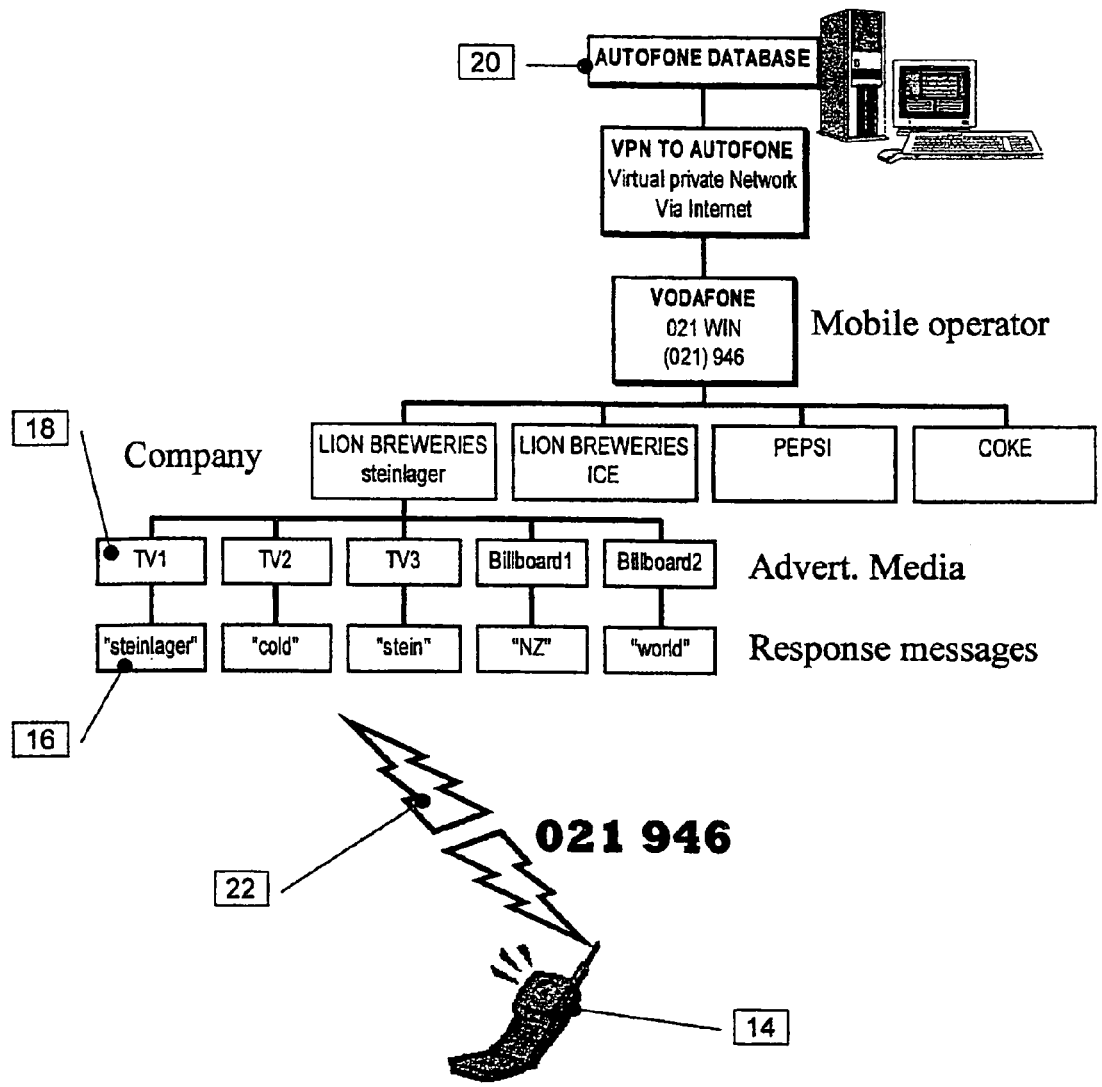
FIG. 2: shows a flow diagram of the components of the invention according to Example 1.

FIG. 2 shows a flow diagram or schema outlining the various components of the invention according to Example 1. In response to an advertisement such as that as shown in FIG. 1, a participant sends a message on a mobile or cell phone 14 and enters the appropriate alphanumeric response or short texted message 16. The response is specific to a particular promotion and the location or where the advertisement was broadcasted from 18 or displayed can be recorded by the computer database 20 which compares and matches the participant's response to a reference list retained in the computer database. If there is a correct match, such as the word "PISA" in the abovementioned example, a short message system (SMS) text reply 22 is sent to the participant's mobile or cell phone instructing the successful participant to access a specific website on the Internet. The participant can then obtain further details on how to progress in the competition or advertising promotion or survey from the referred website. It is envisaged that with the rapid development in information technology and particularly that concerning mobile and cell phones with Internet access, the participants can then access the website directly from their mobile or cell phones without the need of a personal or laptop computer.

Figure 3:
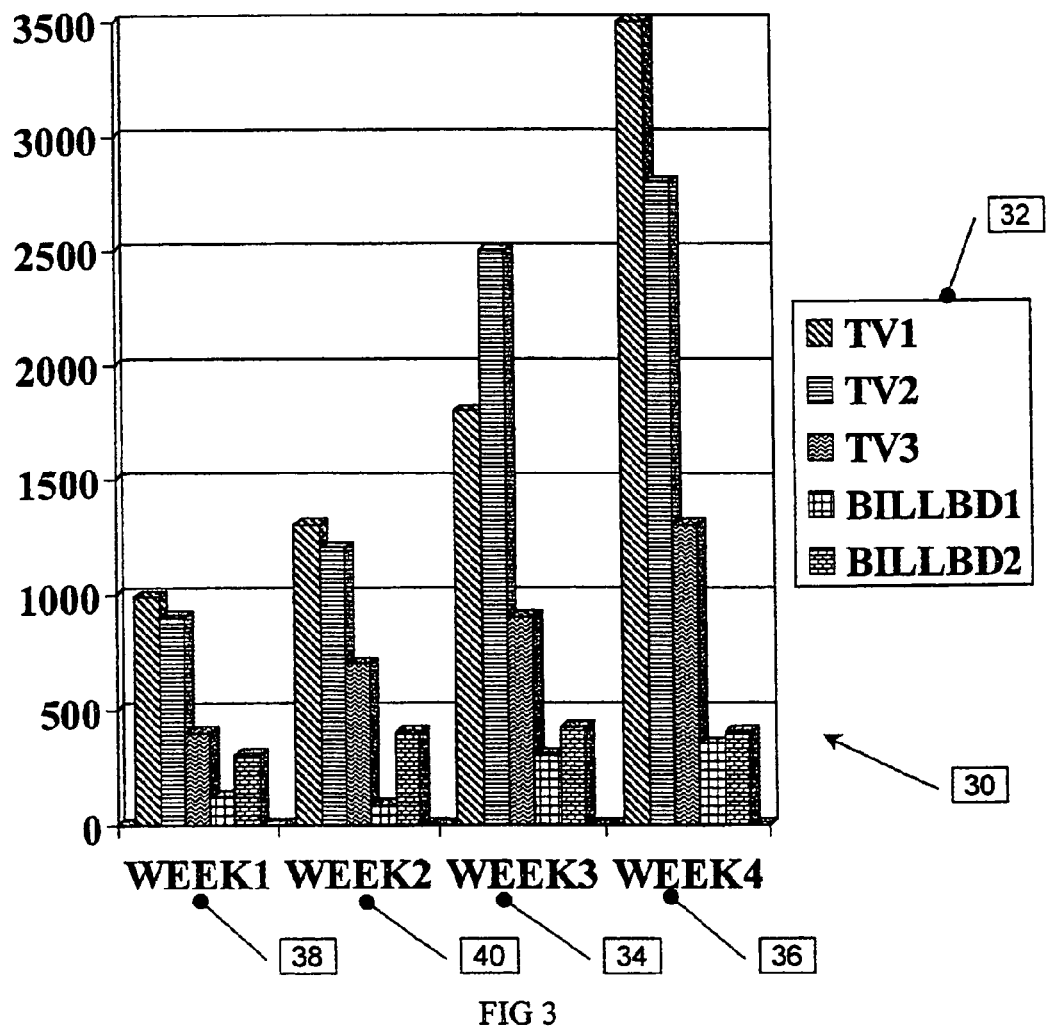
FIGS. 3 and 4: show examples of statistical analyses in the form of bar charts and frequency distribution graphs of the invention in operation.

Referring now to FIG. 3 there shown a bar chart 30 of the number of calls made to a particular advertisement advertised by three television stations and on two bill boards 32. By analysing the bar chart, the effectiveness of the mode of advertising can be gauged from the y-axis, which shows the frequency of calls made to the advertisement. Along the x-axis is shown the duration of the survey, which in this case was over a period of four weeks with the results of each week shown. It will be obvious to the skilled addressee that the frequency of calls made in the later weeks 34, 36 should be greater than those made in the earlier weeks 38, 40 because more consumers would be exposed to the advertisement over time.

Figure 4:
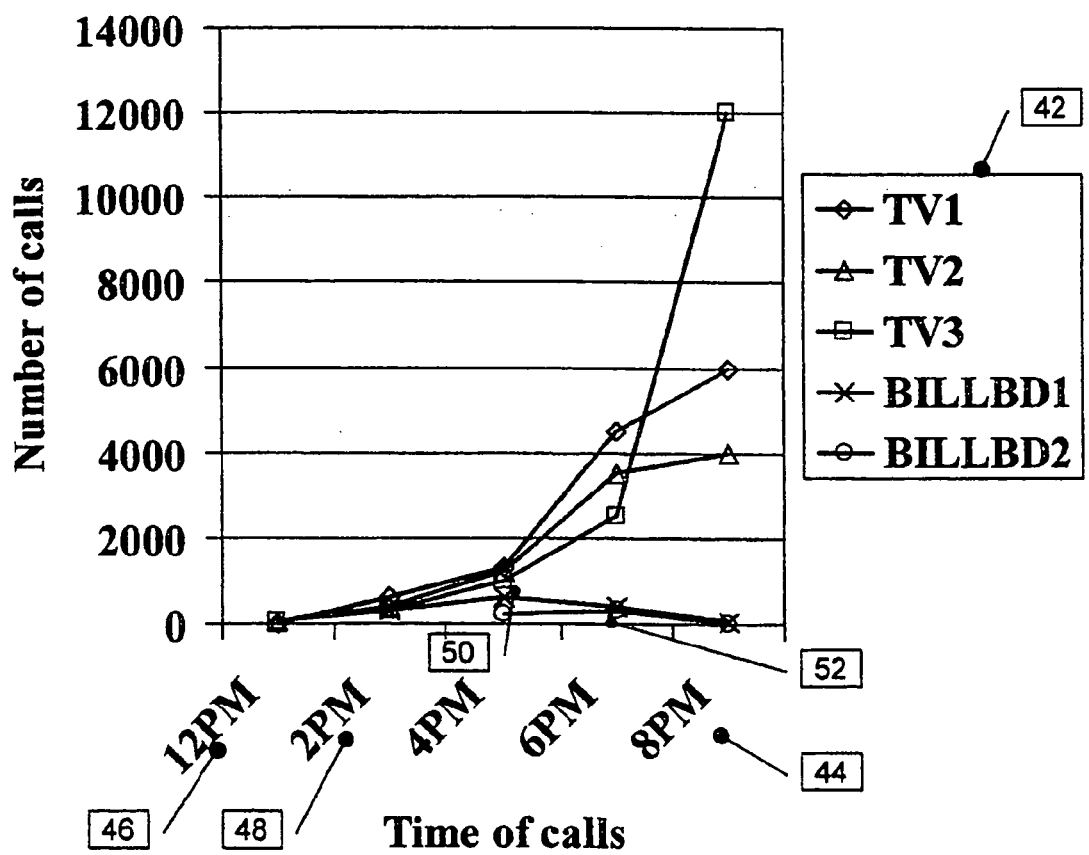

FIG. 4 shows the number of calls made on the y-axis compared to the time of day along the x-axis at which the call is made for an advertisement which was displayed on the three television stations and two bill boards 42 as mentioned previously for FIG. 3.

As far as the advertisement being broadcast by the three television stations from FIG. 4 it can be concluded that the 8 pm slot 44 obtained the most responses as compared to when the advertisement was shown at 12 pm 46 or 2 pm 48 in the afternoon wherein there would have been limited viewing. In contrast responses to the advertisement being displayed on billboards peaked at 5 pm 50 and 7 pm 52 respectively which indicates that effectively this type of advertisement has the greatest exposure when consumers are leaving their work places and possibly as they are driving home.

Figure 5:
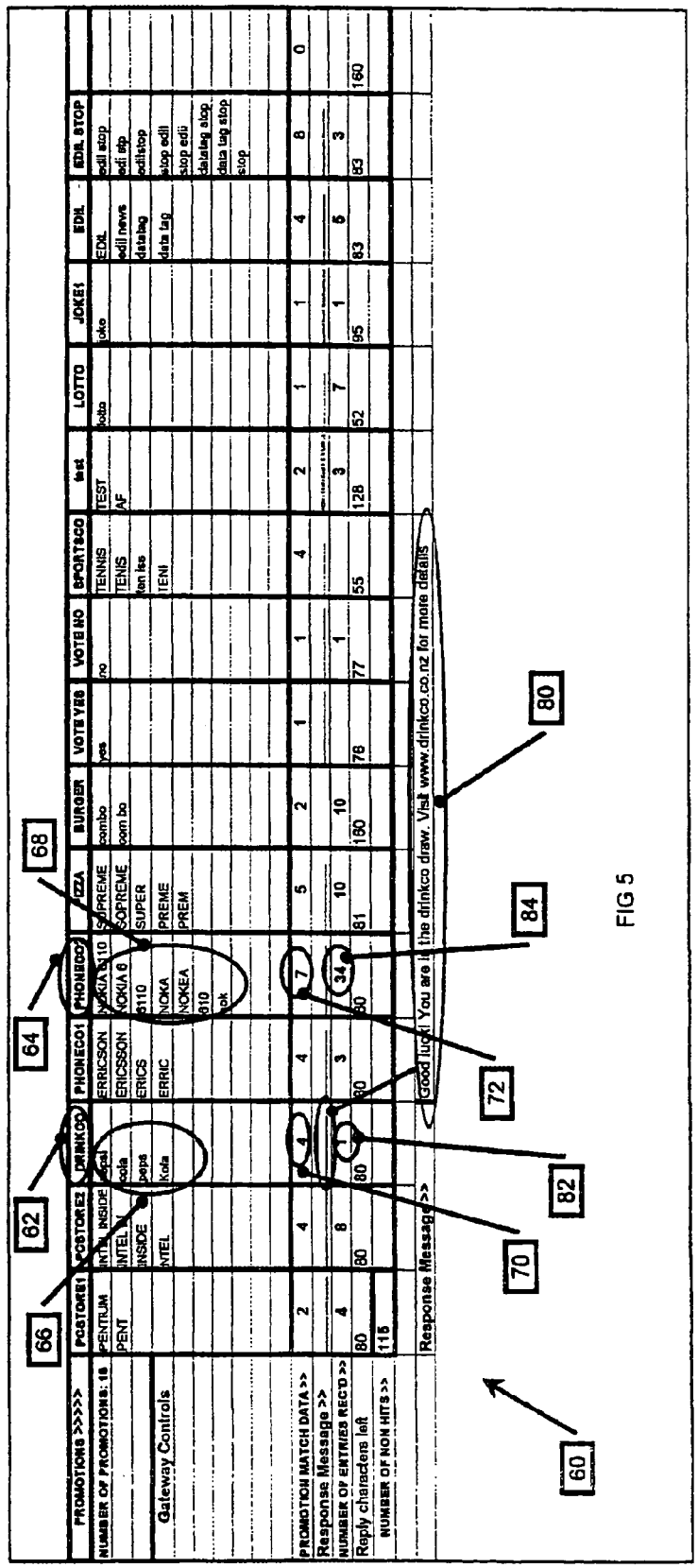
FIG. 5: shows a worksheet of the invention in operation.

Referring now to FIG. 5 which shows a work sheet 60 wherein the various competitions or advertising clients are shown at the top of the columns 62, 64. The appropriate short text message responses 66, 68 are shown under each column together with the number of matches 70, 72 of the correct response as well as the number of entries recorded 82, 84. If a correct match is made between the recorded reference list and the participant's response, a text message 80 inviting the participant to access a website is displayed on the participant's mobile or cell phone (not shown). The number of entries received 82, 84 is recorded which enables a breakdown of the frequency or popularity of the particular competition or survey to be analysed.

Figure 6:
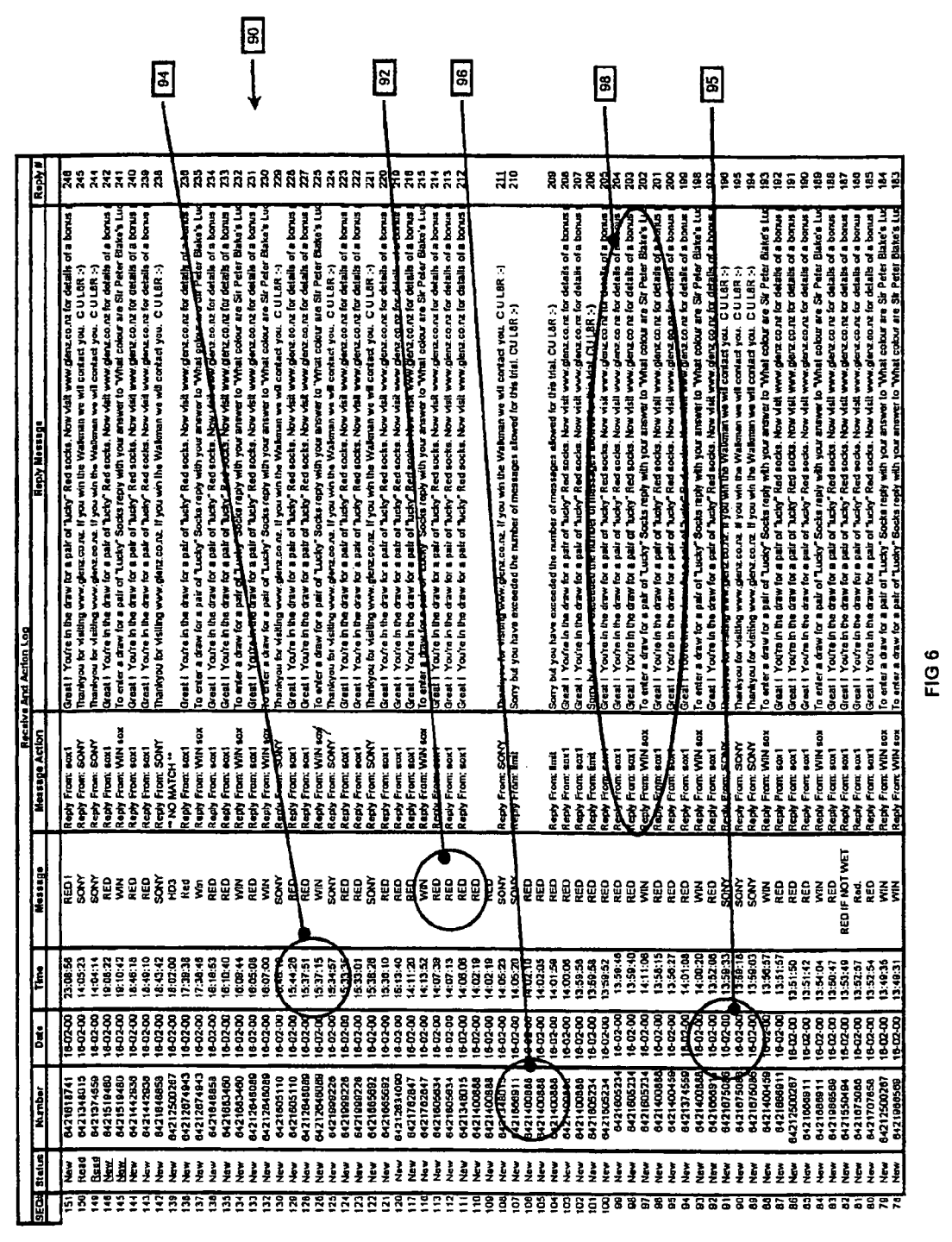

FIG. 6 shows a log of calls received 90 requiring a particular response 92 and the times 94 and dates 95 at which the calls were made and the phone numbers 96 which were received and replied to. The particular response and identification of the client are shown 98. By analysing such a log the popularity or frequency of calls made in response to a particular advertisement or survey question can also be analysed.

Example 2

Product Promotion Example

Figure 7:
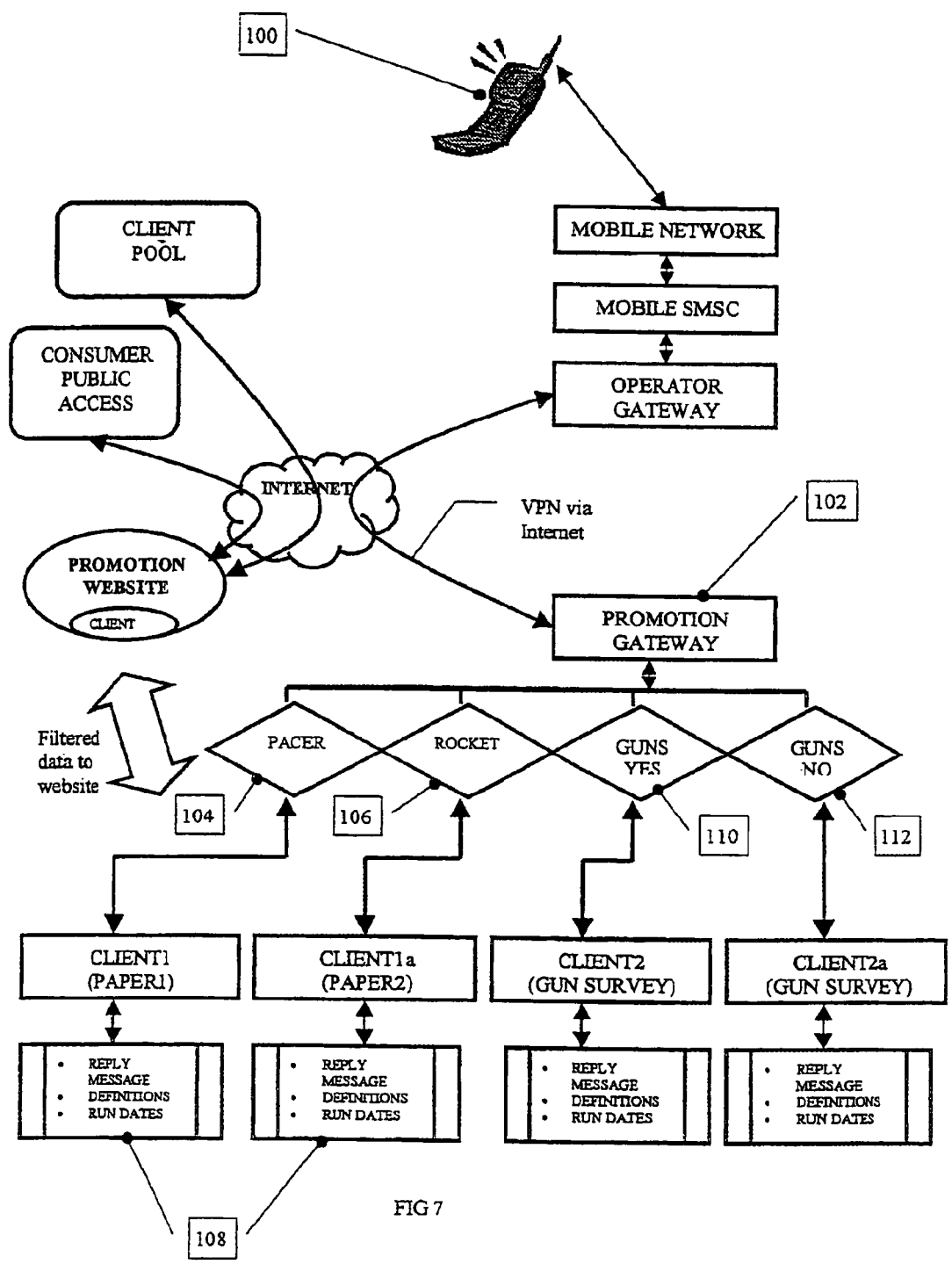
FIG. 7: shows a scheme of an operational layout of the invention according to Example 2 and Example 3 of the invention.

Referring to FIG. 7 there is shown an advertisement by the client ("1") and ("1a"), for example, printed in 2 morning papers (not shown) promoting a new model of running shoe called "Pacer Rockets".

Reader 1 reads the advertisement in paper 1 (not shown) and is invited to enter a draw to win a free pair of the shoes by sending an SMS containing the word "PACER" to number 345678.

Reader 2 reads the advertisement in paper 2 (not shown) and is invited to enter a draw to win a free pair of the shoes by sending an SMS containing the word "ROCKET" to number 345678.

1. Reader 1 and Reader 2 reach for their mobile phones 100 and type in the word "PACER" and "ROCKET" depending on which paper they are reading. In both cases they send this message to 345678.
2. The messages are received at the Promotion gateway 102 of the computer database. The messages contain the mobile number, date sent, time sent, and the message text.
3. The message containing the word "PACER" is processed by a client's application called, "paper 1", 104 searching for the word "PACER". Likewise, the message containing the word "ROCKET" is processed by a client's application called, "paper 2" 106 searching for the word "ROCKET".
4. In this case the same client owns both applications. Both applications in this example simply respond with the same message 108 advising that the entry into the prize draw has been accepted and an invitation is made to visit a website, e.g. "Thank you for entering our PACER ROCKETS prize draw. We will contact you on this number if you are the winner. Visit www.pacerrockets.com for more details."

The transaction is now complete.

Numerous client applications can exist so long as the incoming message from the consumer is always unique.

By running the same advertisement in two newspapers but by varying the word content of the message required to enter the draw the client can obtain answers to the following questions.

How effective was the advertisement in paper 1 compared to paper 2?

What time did the consumers read the advertisement?

What date did the consumers read the advertisement?

Did this advertisement result in a Website visit? The Website can determine this by direct association with the advertisement.

Example 3

Vote or Opinion Poll Example

Referring also to FIG. 7, a television station runs a controversial news story and is seeking public opinion of a new law that would allow guns in schools.

Viewers are invited to join a real time survey where they can send an SMS indicating that they either approve of the new law by sending a message "guns yes" 110. Or if they disapprove they can send the message "guns no" 112. The following steps then ensue:

1. Concerned viewers reach for their mobile phones 100 and send their vote message to number 12345. All voters use this number regardless of the client television station.
2. The messages are received at the Polling gateway 102 of the computer database and routed to one or two applications 110, 112.
3. In the case of a "YES" vote a message is returned to the voter for example, "Your vote in favour of guns in schools has been accepted. So far 10% of voter's agree with you. Stay tuned for the final results or visit www.tvnewsco.com."
4. In the case of a "NO" vote a message is returned to the voter for example, "Your vote against allowing guns in schools has been accepted. So far 90% of voter's agree with you. Stay tuned for the final results or visit www.tvnewsco.com."

The transaction is now complete.

The TV station has a real time, private connection to a specially allocated page on the polling gateway website. The results of the messages are graphically and statistically displayed here in real time indicating the number of "yes" and "no" votes. The TV station can either show this page directly or generate a customised display based on this information.

ADVANTAGES

Cost Advantage of SMS

Existing methods of customer feedback include "900" numbers that attract typically high usage rates to the participant. Rates of a few dollars per minute are not uncommon. This can cause consumer reluctance particularly when younger family members can cause huge phone bills to accumulate. The cost of an SMS typically is half that of posting a letter and in some cases is free. Up to 160 characters of text can be sent using a standard SMS.

Time Advantage of SMS

The use of "physical" mail is decreasing as people move to electronic alternatives such as email. At present, email is still emerging in the mobile phone market so it does not have the convenience factor of SMS. Physical mail requires a larger effort on behalf of the consumer and replies are not immediate.

Interactive Advantage of SMS

When an SMS is sent from a mobile phone the overall delivery time is typically a few seconds. Third party applications that are connected to the SMS gateway should be able to respond in a similar time frame. Intelligent applications can create a 2-way dialog between the consumer and client application in order to request further consumer information or simply to inform the consumer.

Transaction Possibilities

The SMS reply message can inform the consumer that their message has been processed. It may also contain invitations to send a further message to complete the transaction. Invitations to visit Web sites belonging to or linking the promoter client may be made. In the case of an opinion poll or vote system indications may be made of the poll progress such as the number of "YES" or "NO" votes received to date.

Existing Promotion Structures

Existing methods of obtaining customer feedback require a unique destination that is selected by the consumer and that shows the process for them.

With voice based phone applications, this may necessitate the dialing of a unique phone number or dialing a number and selecting a destination by a menu driven process, e.g. Press 1 for "Shoes" or Press 2 for "computers".

With physical mail or email responses an address is required and often a sub address or department has to be indicated, e.g. marketing promotions attn Shoes competition.

SMS Multi Client

By using a common number for SMS delivery, messages can be automatically routed to multiple clients based on the content of the message. This eliminates the need for a unique address/phone number for every client using this system.

By careful selection of the likely or required responses from all the client's customers' messages can be routed to the required client's application for processing and to be responded to.

Every message contains the mobile number of the originating message. This becomes the reply path for the client's application allowing a two-way transaction to occur.

Privacy Advantage of SMS

No subscription is required by the mobile user making it is available for use by any SMS capable phone. The only requirement is that the mobile number is forwarded with the message. One of the biggest fears of potential participants of such SMS transactions is that it may result in un-solicited "junk" messages as occurs with email. It is vital for the success of this system that it remains what the industry refers to as a "pull" service. This means that the participant only gets a message as a result of a message sent by them. The only variation would be notification of a prize that may occur several days or months after the original transaction. To help maintain privacy for consumers the operator of this system must retain ownership of all messages and never divulge mobile numbers to its clients. Only statistical details should be passed to the client's prize-winner contact numbers.

Consumers do not need to pass on their identity further than their mobile number, which is an inherent feature of SMS. This will be a key feature that many consumers will prefer. The only requirement for personal details to be divulged would be in the case of prize delivery etc.

Branding and Association of the SMS Destination Number

To speed up the transaction and likelihood of response it would be ideal that the user already has the number stored in their mobile phone. This would allow consumers to concentrate on the transaction "keyword" rather than trying to remember the phone number. This is particularly useful in the case of Billboard advertising where time is limited. A custom logo (perhaps one for promotions and one for voting) would be used to associate the promotion with an SMS promotion that the consumer had used before. Because they already understand the process they are more likely to respond.

VARIATIONS

Finally it will be appreciated that various other alterations and modifications may be made to the foregoing without departing from the scope of this invention as claimed.

The invention claimed is:

1. An interactive system utilizing short text messages transmitted by Short Message Service (SMS), the interactive system comprising:
(a) a plurality of separate advertisements each advertising by non-SMS means an identical product or service and each inviting one or more participants to respond via a cell phone to a predetermined phone number common to all of the advertisements, wherein each advertisement requests the one or more participants to respond to the advertisement by texting to the predetermined phone number a different predetermined SMS short text message having distinct content that identifies the predetermined SMS short text message as being a response to one of the advertisements and not the other advertisements; and
(b) a computer system for receiving a short text message sent from the one or more participants via SMS to the predetermined phone number in response to the plurality of advertisements, the computer system adapted to identify the received short text message as being in response to a particular one of the advertisements by searching a content of the received short text message and identifying at least a portion of the distinct content associated with at least one of the advertisements in the content of the received short text message, and wherein the computer system is constructed and arranged to send an automated short text message reply via SMS to the cell phone in response to receiving the received short text message.

2. The interactive system of claim 1, wherein the automated short text message reply directs a recipient to access a preselected website.

3. The interactive system of claim 1, wherein the computer system is adapted to select from a plurality of different preselected reply messages to send as the automated short text message reply based on the distinct content identified in the received short text message.

4. The interactive system of claim 1, wherein the computer system is adapted to record information obtained from the received short text message in a database, the recorded information including at least a phone number associated with the cell phone.

5. The interactive system of claim 1, wherein the computer system is adapted to compare the received short text message with one or more reference records and identify the received short text message as being associated with a particular advertising campaign selected from a plurality of advertising campaigns depending upon which of the one or more reference records the received short text message at least partially matches.

6. An interactive system utilizing Short Message Service (SMS) short text messages, the interactive system comprising:
(a) a first advertisement and a second advertisement each advertising an identical product or service via non-SMS based media, wherein each advertisement invites one or more participants to respond via a cell phone to a single predetermined phone number, wherein each advertisement includes distinct content not present in the other advertisement, and wherein each advertisement includes instructions requesting the one or more participants to respond to the advertisement by sending a predetermined SMS short text message to the single predetermined phone number; and
(b) a computer system for receiving a short text message sent from the one or more participants by SMS to the predetermined phone number, the computer system adapted to identify the received short text message as being in response to either the first advertisement or the second advertisement and not the other advertisement by searching a content of the received short text message and locating at least a portion of the distinct content associated with the first or second advertisement which the responder is responding to in the content of the received short text message.

7. The system of claim 6, wherein the distinct content of the first advertisement indicates that the first advertisement was presented in a first predetermined area and wherein the distinct content of the second advertisement indicates that the second advertisement was presented in a second predetermined area different than the first predetermined area in which the first advertisement was presented.

8. The system of claim 6, wherein the distinct content of the first advertisement indicates that the first advertisement was presented during a first predetermined time slot and wherein the distinct content of the second advertisement indicates that the second advertisement was presented during a second predetermined time slot different than the first predetermined time slot in which the first advertisement was presented.

9. The system of claim 6, wherein the distinct content of the first advertisement indicates that the first advertisement was presented by a first advertising entity and wherein the distinct content of the second advertisement indicates that the second advertisement was presented by a second advertising entity separate from the first advertising entity.

10. The system of claim 6, wherein the product or service is a polling service requesting a response to a survey question.

11. The system of claim 6, wherein the first advertisement is of a first type of media and the second advertisement is of a second type of media different than the first type of media.

12. The system of claim 11, wherein the first and second types of media are selected from a group consisting of television, radio, printed material, billboard, film, and internet.

13. The system of claim 6, wherein the computer system is constructed and arranged to automatically send a response via SMS to the received short text message containing additional information related to the product or service.

14. The system of claim 13, wherein the response includes instructions to access an internet website related to the product or service.

15. The system of claim 13, wherein the product or service is a polling service and the predetermined short text message includes an answer to a survey question, and wherein the computer system is adapted to automatically record a number of responses made by the one or more participants having a first predetermined answer and also record a number of responses made by the one or more participants having a second predetermined answer, and wherein the automatically sent response includes an indication of whether more respondents have answered the survey question with the first predetermined answer or the second predetermined answer.

16. The system of claim 6, further comprising a third advertisement advertising via non-SMS based media a different product or service than advertised by the first and second advertisements, wherein the third advertisement invites one or more participants to respond via a cell phone to the single predetermined phone number, wherein the third advertisement includes distinct content not present in the first or second advertisements, and wherein the computer system is adapted to identify the received short text message as being in response to either the first, second, or third advertisement and not the other advertisements by searching the content of the received short text message and locating at least a portion of the distinct content associated with the first, second, or third advertisement which the responder is responding to in the content of the received short text message.

17. The system of claim 16, wherein the first and second advertisements are sponsored by a first entity and the third advertisement is sponsored by a second entity separate from the first entity, wherein the computer system is adapted to automatically route the received short text message received via SMS to either the first entity or the second entity based on whether the portion of the distinct content identified by the computer system in the content of the received short text message is associated with the first, second, or third advertisement.

18. The system of claim 6, wherein the distinct content is a single word or a single string of characters.

19. The system of claim 6, wherein the first advertisement and second advertisement each invite the one or more participants to enter a draw to win a prize by responding to the first or second advertisement by texting via SMS the predetermined short text message to the predetermined phone number.

20. A method of operating an interactive system utilizing Short Message Service (SMS) text messages, the method comprising:
(a) presenting, by at least one of visual and non-visual means, at least a first advertisement and a second advertisement, each advertising an identical product or service by non-SMS means, wherein the first and second advertisements each include a unique code not present in the other advertisement, and wherein each advertisement invites one or more participants to respond to the advertisement by sending a predetermined SMS short text message via a cell phone to a single predetermined phone number;
(b) providing a database stored on a computer, the database containing the first code and the second code, the database correlating the first and second codes to the first and second advertisements, respectively;
(c) receiving, by an SMS gateway, via SMS, a short text message sent from the one or more participants to the predetermined phone number in response to the first or second advertisement;
(d) searching, by computer, a content of the received short text message and identifying at least a portion of the unique code associated with the first or second advertisement which the responder is responding to in the content of the received short text message; and
(e) classifying, by computer, the received short text message as being in response to either the first or the second advertisement and not the other advertisement depending on whether the portion of the unique code identified is associated with the first or second advertisement.

21. The method of claim 20, further comprising presenting the first advertisement at a first time slot and presenting the second advertisement at a second time slot later than the first time slot and determining a quantity of responses received at the predetermined phone number in response to the first advertisement and determining a quantity of responses received at the predetermined phone number in response to the second advertisement.

22. The method of claim 21, further comprising presenting the first and second advertisements at different times in a single day.

23. The method of claim 20, further comprising presenting the first advertisement at a first location and presenting the second advertisement at a second location located remotely of the first location and determining a quantity of responses received at the predetermined phone number in response to the first advertisement and determining a quantity of responses received at the predetermined phone number in response to the second advertisement.

24. The method of claim 20, further comprising having a first entity present the first advertisement by non-SMS means and having a second entity present the second advertisement by non-SMS means and determining a quantity of responses received via SMS at the predetermined phone number in response to the first advertisement and determining a quantity of responses received via SMS at the predetermined phone number in response to the second advertisement.

25. The method of claim 20, wherein the product or service is a polling service requesting a survey response.

26. The method of claim 20, further comprising presenting the first advertisement by a first type of media and presenting the second advertisement by a second type of media different than the first type of media.

27. The method of claim 26, wherein the first and second types of media are selected from a group consisting of television, radio, print media, billboard, film, and internet.

28. The method of claim 20, further comprising automatically sending a response to the received short text message via SMS containing additional information related to the product or service.

29. The method of claim 28, wherein the response includes instructions to access an internet website related to the product or service.

30. The method of claim 20, wherein the unique code associated with the first advertisement is used to identify that the first advertisement was presented in a different geographic location than the second advertisement.

31. The method of claim 20, further comprising using the unique code associated with the first advertisement to indicate that the first advertisement was presented at a different time than the second advertisement.

32. The method of claim 20, further comprising presenting the first advertisement on a first piece of print media, presenting the second advertisement on a second piece of print media separate from the first piece of print media, and using the unique code associated with the first advertisement to indicate that the first advertisement was presented on the first piece of print media and not on the second piece of print media.

33. The method of claim 20, further comprising using the unique code associated with the first advertisement to indicate that the first advertisement was presented by a predetermined type of media, at a predetermined time, at a predetermined location, or by a predetermined entity.

34. The method of claim 20, further comprising using the first and second advertisements to invite the one or more participants to enter a draw to win a prize by responding to the first or second advertisement by texting the predetermined short text message to the predetermined phone number.

35. An interactive system utilizing short text messages transmitted via Short Message Service (SMS), the interactive system comprising:
(a) at least a first advertisement and a second advertisement each concurrently advertising via non-SMS means an identical product or service, wherein each advertisement invites one or more participants to respond via a cell phone to a single predetermined phone number, wherein each advertisement includes instructions requesting the one or more participants to respond with a different predetermined SMS short text message having distinct content that distinctly identifies the predetermined SMS short text message as being a response to either the first advertisement or the second advertisement and not the other advertisement; and (b) a computer system for receiving a short text message sent via SMS from the one or more participants to the single predetermined phone number in response to the first and second advertisements, the computer system adapted to identify the received short text message as being in response to either the first advertisement or the second advertisement and not the other advertisement by searching a content of the received short text message and identifying at least a portion of the distinct content associated with the first or second advertisement which the responder is responding to in the content of the received short text message.

36. A method of operating an interactive system which utilizes Short Message Service (SMS), the method comprising:

(a) presenting, by at least one of visual and non-visual means, multiple advertisements each advertising an identical product or service by non-SMS means, each advertisement inviting participants to send via SMS a text message containing a respective one of multiple predetermined codes via a cell phone to the same predetermined phone number, wherein at least one of the predetermined codes is different from other of the predetermined codes associated with other of the multiple advertisements;

(b) providing a database stored on a computer, the database containing the multiple predetermined codes, the database correlating the multiple predetermined codes to respective ones of the multiple advertisements;

(c) receiving, by an SMS gateway, via SMS, the short text messages sent by the participants to the predetermined phone number in response to the multiple advertisements;

(d) searching, by computer, a content of each of the received text messages for the multiple predetermined codes; and (e) classifying, by computer, each of the received text messages as being in response to a respective one of the multiple advertisements based on the correlation between the predetermined code contained in said text message and the respective one of the multiple advertisements.

37. A method of operating an interactive system utilizing Short Message Service (SMS) text messages, the method comprising:

(a) presenting, by at least one of visual and non-visual means, a plurality of different advertisements, each of the advertisements inviting participants to send an SMS short text message to single predetermined SMS-capable phone number, each of the different advertisements identifying as the SMS short text message a respective one of multiple codes, each of the multiple codes being distinguishable from other of the multiple codes by a computer;

(b) storing information in a computer database that defines a correlation between the multiple codes and the different advertisements, respectively;

(c) receiving, by an SMS gateway, via SMS, the short text messages sent by the participants to the predetermined SMS-capable phone number, in response to one of the different advertisements;

(d) searching, by computer, content of each of the received short text messages and identifying the computer-distinguishable code contained in said received short text message; and (e) classifying, by computer, the received short text messages to produce a set of classified results in terms of the different advertisements based on the correlation between the respective computer-distinguishable codes and the different advertisements.

38. The method of claim 37, wherein the classified results are displayed in real time.

* * * * *